United States Patent
Chung

(10) Patent No.: US 8,050,159 B2
(45) Date of Patent: Nov. 1, 2011

(54) METHOD OF RECORDING DATA ON OPTICAL DISC AND OPTICAL DISC APPARATUS

(75) Inventor: Sunggoo Chung, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 61 days.

(21) Appl. No.: 12/630,442

(22) Filed: Dec. 3, 2009

(65) Prior Publication Data

US 2010/0142337 A1    Jun. 10, 2010

(30) Foreign Application Priority Data

Dec. 4, 2008   (KR) .................. 10-2008-0122557

(51) Int. Cl.
    *G11B 7/00* (2006.01)
(52) U.S. Cl. ............... 369/47.51; 369/47.54; 369/116
(58) Field of Classification Search .............. None
    See application file for complete search history.

(56) References Cited

U.S. PATENT DOCUMENTS

| | | | | |
|---|---|---|---|---|
| 7,821,891 | B2* | 10/2010 | Suzuki et al. | 369/47.53 |
| 2002/0036959 | A1* | 3/2002 | Yen et al. | 369/47.51 |
| 2003/0063536 | A1* | 4/2003 | Wang et al. | 369/47.53 |
| 2003/0081517 | A1* | 5/2003 | Kim | 369/47.47 |
| 2007/0076551 | A1* | 4/2007 | Shimakawa | 369/47.53 |
| 2007/0211594 | A1* | 9/2007 | Tomishima | 369/47.5 |
| 2007/0217306 | A1* | 9/2007 | Suzuki et al. | 369/47.53 |

* cited by examiner

*Primary Examiner* — Jorge Ortiz Criado

(74) *Attorney, Agent, or Firm* — Birch, Stewart, Kolasch & Birch, LLP

(57) ABSTRACT

This document relates to a method of recording data on an optical disc and an optical disc apparatus. The method of recording data on an optical disc may comprise determining a recording speed at which a recording power control operation will be performed based on a recording start position and the amount of data for which recording has been requested, performing the recording power control operation at the determined recording speed, and recording the data for which recording has been requested on the optical disc based on a result of performing the recording power control operation.

19 Claims, 3 Drawing Sheets

METHOD OF RECORDING DATA ON OPTICAL DISC AND OPTICAL DISC APPARATUS

This application claims the benefit of Korean Patent Application No. 10-2008-0122557 filed on Dec. 4, 2008, which is hereby incorporated by reference.

BACKGROUND

1. Field

This document relates to a method of recording data on an optical disc and an optical disc apparatus.

2. Related Art

To record a large amount of data on an optical disc within a short period of time, high-speed media and high-speed recording apparatuses are being commercialized.

To secure a recording quality, an optical disc apparatus detects an optimal recording power by performing an optimum power control (OPC) operation in a predetermined area (e.g., power calibration area (PCA)) of an optical disc and performs a requested recording operation based on the detected optimal recording power.

The optical disc apparatus performs an OPC operation at a low speed (e.g., 6-times speed) in an inner-peripheral PCA placed on the inner side to the lead-in area of an optical disc or, if appropriate, performs an OPC operation at a high speed (e.g., 12 or 16-times speed) in an outer-peripheral PCA placed on the outer side to the data area of the optical disc, and, based on the OPC operation(s), detects or calculates an optimal recording power for each recording speed to be applied when recording data while increasing the recording speed from the inner peripheral area of a data area to the outer peripheral area of the data area.

However, if the OPC operations are performed both in the inner peripheral area and the outer peripheral area of the optical disc or the OPC operations are performed at several speeds, the time that it takes to perform the OPC operations is increased, thereby delaying the recording operation and increasing the entire recording time. Further, data may not be recorded on a corresponding disc because an OPC fail may occur while performing the OPC operation at a high recording speed.

SUMMARY

An aspect of this document is to provide a method capable of removing the execution of the OPC operation at unnecessary recording speeds and reducing the entire recording time from a recording request to a recording end.

A method of recording data on an optical disc according to an aspect of this document comprise determining a recording speed at which a recording power control operation will be performed based on a recording start position and the amount of data for which recording has been requested, performing the recording power control operation at the determined recording speed, and recording the data for which recording has been requested on the optical disc based on a result of performing the recording power control operation.

An optical disc apparatus according to another aspect of this document comprises an optical pickup configured to record data on an optical disc or read data from the optical disc using a laser beam, a recording/playback system configured to drive a spindle motor, a sled motor, and an optical pickup and process servo signals and recording/playback data, and a controller configured to control the recording/playback system. The controller is configured to determine a recording speed at which a recording power control operation will be performed based on a recording start position and the amount of data for which recording has been requested, and control the recording/playback system so that the recording/playback system performs the recording power control operation at the determined recording speed and records the data for which recording has been requested on the optical disc based on a result of performing the recording power control operation.

In an embodiment, the recording start position can be checked before the request for recording request is made.

In an embodiment, determining the recording speed may comprise calculating a recording end position based on the recording start position and the amount of data for which recording has been requested, calculating the range of a recording speed available from the recording start position to the recording end position, and selecting one or more recording speeds at which the recording power control operation will be performed based on the calculated range.

In an embodiment, selecting the one or more recording speeds may comprise determining the number of recording speeds at which the recording power control operation will be performed based on the calculated range. Further, the one or more recording speeds may be selected within the calculated range or outside of the calculated range. Further, an area in which the recording power control operation will be performed at the selected recording speeds may be selected.

In an embodiment, a recording power for each of the recording speeds within the calculated range may be calculated based on results of performing the recording power control operation at the selected recording speeds.

In an embodiment, if a recording speed is designated, the calculated range and the designated recording speed may be compared, and the one or more recording speeds at which the recording power control operation will be performed may be selected based on a result of the comparison. If, as a result of the comparison, the designated recording speed is lower than the lowest limit value of the calculated range, the designated recording speed may be selected as a recording speed at which the recording power control operation will be performed. If, as a result of the comparison, the designated recording speed is included within the calculated range, the lowest limit value of the calculated range to the designated recording speed may be determined as a new range of a recording speed, and a recording speed at which the recording power control operation will be performed may be selected based on the new range.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

Hereinafter, a method of recording data on an optical disc and an optical disc apparatus according to this document will be described in detail with reference to the attached drawings.

A difference in the radius of the innermost periphery and the outermost periphery of a data area within an optical disc is about 2.4 times. Thus, if the optical disc is rotated in the CAV mode when writing or playing back data, a linear velocity (speed) at the outermost periphery is about 2.4 times greater than a linear velocity at the innermost periphery.

A maximum recording speed of the optical disc apparatus is determined by the highest rotation speed of a spindle motor, the transfer function of an actuator, the output power of a laser diode, and so on. In general, a maximum recording speed corresponds to a recording speed at the outermost periphery.

Accordingly, an available maximum recording speed at the innermost periphery is about 1/2.4 times a maximum recording speed of the optical disc apparatus (i.e., a maximum recording speed at the outermost periphery). For example, when a maximum speed of an optical disc apparatus is a 16-times speed, a maximum recording speed at the innermost periphery is 16/2.4=6.7-times speed.

Figure 1:
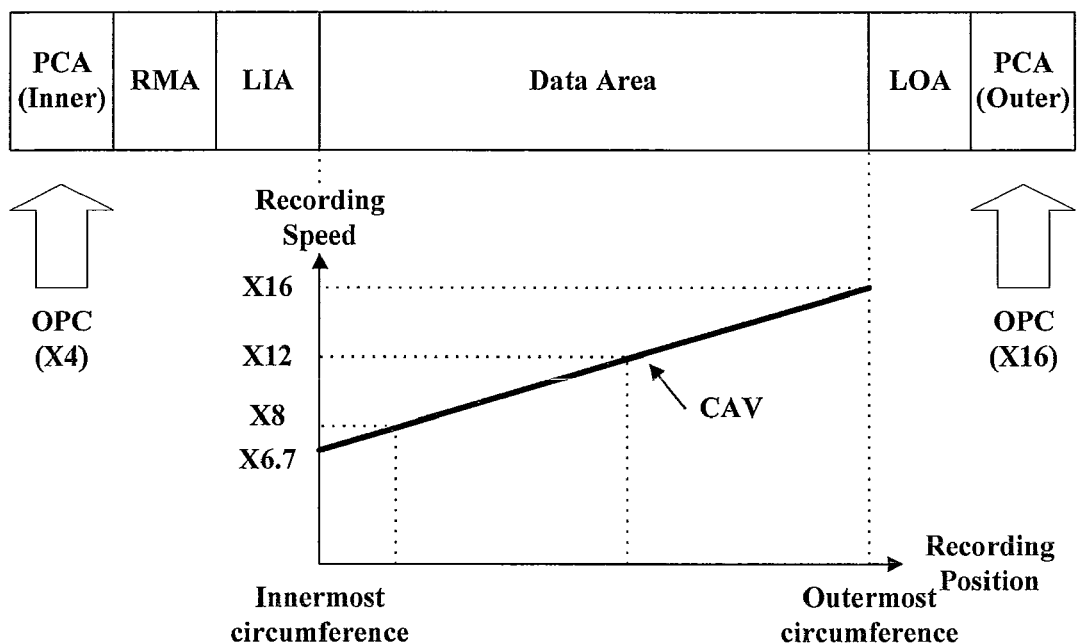
FIG. 1 is a diagram showing an example in which the recording speed is changed according to the radius position of a disc in a constant angle velocity (CAV) mode.

Accordingly, if an optical disc is rotated in the CAV mode (i.e., at a constant angular speed) when writing data from the inner circumference to the outer circumference of a data area, the data recording speed, as shown in FIG. 1, is gradually increased from about a 6.7 (1/2.4 of 16-times speed)-times speed to a 16-times speed.

When a request to write data on an optical disc is received from a user, an optical disc apparatus divides a maximum speed, permitted by the optical disc apparatus or an optical disc inserted into the optical disc apparatus, into a predetermined number of sections or divides a speed which is a predetermined speed lower than the maximum speed into a predetermined number of sections, performs an OPC operation in an inner peripheral area and/or an outer peripheral area of the optical disc for a representative speed of each section, and calculates an optimal recording power for each speed based on results of executing the OPC operation.

For example, assuming that a maximum recording speed permitted by an optical disc apparatus is a 22-times speed and a maximum speed permitted by an optical disc is a 24-times speed, the optical disc apparatus can divide the speed interval from 1-times speed (or 9.2-times speed (1/2.4 of 22-times speed) to the 22-times speed into, for example, 5 sections or the speed interval from a 1-times speed (or 6-times speed (a maximum speed at which the OPC operation will be performed at an inner peripheral area)) to a 16-times speed (a maximum speed when performing an OPC operation at an outer peripheral area) into 5 sections, and perform OPC operations at the inner peripheral area and the outer peripheral area of the optical disc for a representative speed of each section.

If a user's request for recording is to write data on the entire data area of an optical disc at a maximum speed, an optical disc recording apparatus preferably performs OPC operations at several speeds that can be determined as described above and calculates an optimal recording power for each speed based on the results of executing the OPC operations.

On the other hand, when the amount of data for which recording has been requested by a user is small, an area occupied by the data to be recorded is narrow in the data area of an optical disc on the basis of the radial direction of the disc, and so the range of a speed at which the corresponding data will be recorded is also narrow. In this case, it is meaningless to perform OPC operations on a number of speeds, including speeds other than the speed at which the corresponding data will be recorded, irrespective of a speed at which recording will be performed.

Accordingly, in this document, a speed at which an OPC operation will be performed is determined with consideration taken of the amount of data for which recording has been requested. Here, a position of an optical disc at which the data for which recording has been requested will be written is taken into consideration. This is because, when data are recorded on an optical disc in a multi-session manner, a recording speed differs according to a position on the basis of the radial direction of an optical disc (i.e., position at which data for which recording has been requested will be written).

Further, in this document, when a user designates a recording speed, a speed at which an OPC operation will be performed can be determined by taking the designated recording speed into consideration.

For example, in the case where a user has requested data recording at a 12-times speed, but a maximum speed permitted at the innermost periphery of a corresponding disc is a 6-times speed (or a speed permitted at a start position at which the data recording will be started (a last position at which data have already been recorded) is less than a 12-times speed (e.g., 8-times speed)), an optical disc recording apparatus records the data on the disc at a 6-times speed (or 8-times speed) while gradually increasing the recording speed from the innermost periphery (or the start position) to a position at which the 12-times speed is available and then records the data on the disc while maintaining the 12-times speed from the position at which the 12-times speed is available.

Accordingly, in this document, if a user designates a recording speed, the amount of data for which recording has been requested and the range of a radial direction in which the requested data will be written from a position at which the recording will be started can be checked, available recording speeds in the checked range and the recording speed designated by the user can be compared with each other, and one or more recording speeds at which OPC operations will be performed can be determined.

Figure 2:
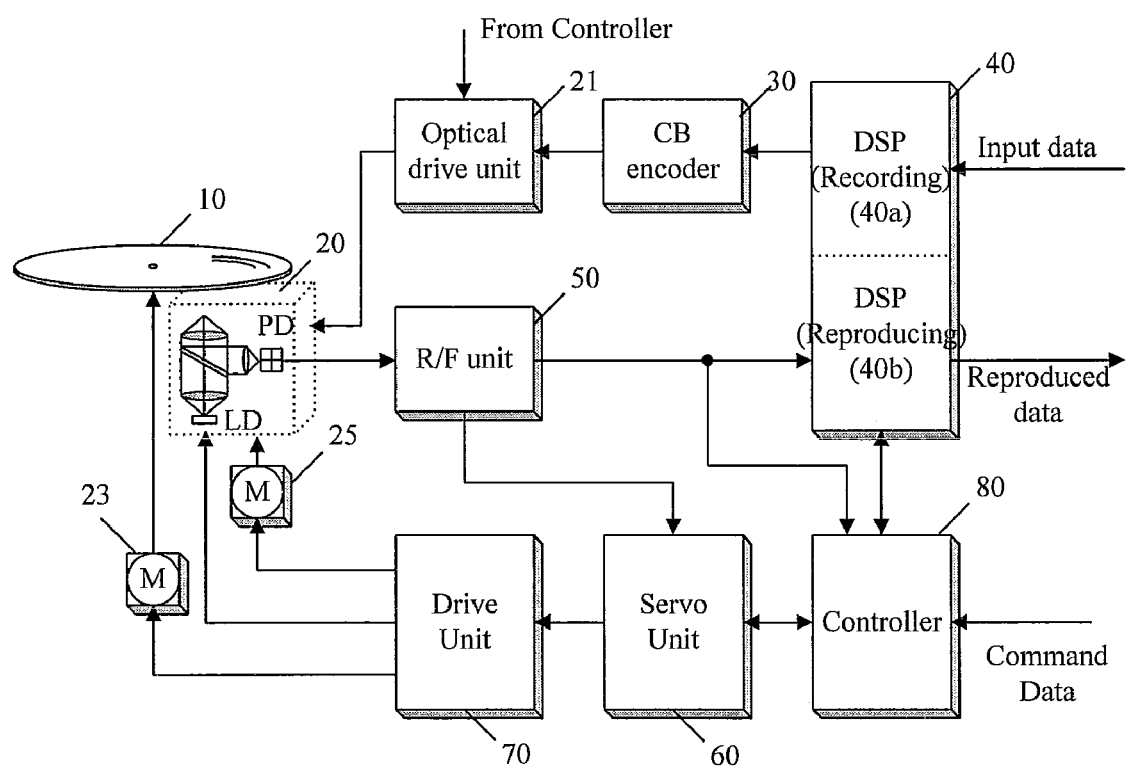
FIG. 2 is a diagram showing the construction of a disc apparatus to which a data recording method according to an embodiment of this document is applied.

A method of recording data on an optical disc according to an embodiment of this document can be applied to various types of optical disc apparatuses, such as a DVD recorder. FIG. 2 shows an embodiment referring to the construction of an optical disc apparatus to which this document can be applied.

The optical disc apparatus according to the embodiment of this document can chiefly comprise an optical pickup 20 configured to record data on an optical disc or read data from the optical disc using a laser beam, a recording/playback system configured to drive a spindle motor 23, a sled motor 25, and the optical pickup 20 and to process servo signals and recording/playback data, and a controller 80 configured to control the recording/playback system. The recording/playback system may comprise an optical drive unit 21, the spindle motor 23, the sled motor 25, a channel bit (CB) encoder 30, a digital recording signal processor 40*a*, a digital playback signal processor 40*b*, an R/F unit 50, a servo unit 60, a drive unit 70, and so on. Alternatively, the optical drive unit 21 may be equipped in the optical pickup 20.

The digital recording signal processor 40*a* adds error correction codes (ECC), etc. to received digital data and converts a format of the digital data into a recording format. The CB encoder 30 converts the data having the recording format into bit streams. The optical drive unit 21 outputs a laser-intensity driving signal according to a received signal. The optical pickup 20 records the data on an optical disc 10 in response to the laser-intensity driving signal and reads data from a recording layer of the optical disc 10.

The R/F unit 50 filters and normalizes a signal detected by the optical pickup 20 and outputs a binary signal. The R/F unit 50 further generates a tracking error signal TE, a focus error signal FE, a RF signal, etc. The digital playback signal processor 40*b* restores the binary signal to its original data using a clock whose phase has been synchronized with the binary signal. The servo unit 60 generates servo signals for a focusing servo, a tracking servo, a sled servo, and a spindle servo in response to the signal generated by the R/F unit 50. The drive unit 70 drives the spindle motor 23 for rotating the optical disc 10, drives the sled motor 25 for moving the optical pickup 20 in the inner or outer circumferential direction, and also drives current for a focusing servo and a tracking servo of an object lens within the optical pickup 20.

The controller 80 controls the elements of the optical disc apparatus such that data are recorded on the optical disc or data recorded on the optical disc are read. The controller 80 controls the optical drive unit 21 such that a laser diode within the optical pickup 20 is driven as power for playback in order to read data from the optical disc 10 or the laser diode is driven as power for recording in order to record data on the optical disc 10 or perform an OPC operation.

Further, the controller 80 controls the servo unit 60 and the drive unit 70 based on an RF signal, detected by the optical pickup 20 and outputted from the R/F unit 50, such that the spindle motor 23 rotates the optical disc 10 at a desired velocity and the sled motor 25 moves the optical pickup 20 to a desired position. The controller 80 controls the drive unit 70 to apply current to the actuator that supports the object lens within the optical pickup 20 and performs a focusing servo and a tracking servo.

If there is a request for data recording, the controller 80 detects an optimal recording power by performing OPC operations in an inner-peripheral PCA or an outer-peripheral PCA or both of the optical disc and writes the requested data in the data area of the optical disc.

In more detail, the controller 80 can calculate a last position at which the requested data will be recorded based on a start position at which the requested data will be recorded and the amount of the requested data, calculate the range of an available recording speed from the start position to the last position (the range may differ according to the apparatus or a disc inserted into the apparatus), select one or more speeds within the calculated range, obtain an optimal recording power that will be applied to each of the one or more recording speeds by performing OPC operations on the one or more recording speeds, and perform a data recording operation based on the obtained optimal recording powers.

The controller 80 can differently control the number of recording speeds at which OPC operations will be performed according to the range of a recording speed at which requested data will be recorded. For example, if the range of the recording speed is wide, the controller 80 may perform an OPC operation for three or more recording speeds. If the range of the recording speed is not wide, the controller 80 may perform an OPC operation for two recording speeds. If the amount of data to be recorded is very small, the controller 80 may perform an OPC operation for only one recording speed. A simple method for selecting two recording speeds within the calculated range may be to select the lowest and highest limit values of the calculated range, and a method for selecting three or more speeds may be to divide the calculated range into uniform sizes.

The controller 80 may determine whether to perform the determined OPC operation in an inner-peripheral PCA, an outer-peripheral PCA, or both the inner-peripheral PCA and the outer-peripheral PCA according to the value of a recording speed at which the OPC operation will be performed. If the value of a recording speed at which the OPC operation will be performed is smaller than a recording speed available at the innermost periphery of a disc, the controller 80 can perform the OPC operation in an inner-peripheral PCA. If the value of a recording speed at which the OPC operation will be performed is greater than a recording speed available at the innermost periphery of the disc, the controller 80 can perform the OPC operation in an outer-peripheral PCA. Further, in the case where the range of a recording speed at which the OPC operation will be performed is wide, it may be advantageous to perform the OPC operation both in an inner-peripheral PCA and an outer-peripheral PCA.

When determining a recording speed at which the OPC operation will be performed after calculating the range of the recording speed at which data recording will be performed, the controller 80 needs not to determine a recording speed at which the OPC operation will be performed only within the calculated range, but may advantageously perform the OPC operation for a recording speed outside the calculated range or for every at least one selected recording speed within and outside of the calculated range in order to secure the stability of the OPC operation or reduce the time taken for the OPC operation to be executed.

For example, in the case where a maximum recording speed available in the innermost periphery is an 8-times speed, but the range of a recording speed that will apply to data recording is a 6-times speed to a 10-times speed, an OPC operation has to be performed both in an inner-peripheral PCA and an outer-peripheral PCA or the OPC operation has to be performed in the outer-peripheral PCA. In this case, however, a 4-times speed (or 6-times speed) and an 8-times speed may be selected, the OPC operation may be performed only in the inner-peripheral PCA, and recording powers for the 8-times speed to the 10-times speed may be induced from results of executing the OPC operation.

For example, in the case where the range of a recording speed that will apply to data recording includes a maximum speed permitted by a disc or an apparatus, the maximum speed may not be selected as a recording speed at which the OPC operation will be performed and a speed slightly slower than the maximum speed may be selected as the recording speed. In general, the physical characteristics (eccentricity, surface vibration, etc.) and properties of matter (the uniformity of a recording layer, etc.) of a disc are deteriorated toward an outer peripheral area of the disc. If an OPC operation is performed at a maximum speed in an outer-peripheral PCA (i.e., the outermost periphery of the disc), there is a high probability that an OPC operation fail may occur.

For example, in the case where a user designates a recording speed that will apply to data recording, the controller 80 compares the range of the calculated recording speed and the designated recording speed and determines a recording speed at which the OPC operation will be performed based on a result of the comparison. If, as a result of the comparison, the designated recording speed is higher than the highest limit value of the calculated recording speed range, the controller 80 can determine a recording speed at which the OPC operation will be performed using the above method. If, as a result of the comparison, the designated recording speed is lower than the lowest limit value of the calculated recording speed range, the controller 80 can determine the designated recording speed as a recording speed at which the OPC operation will be performed. If, as a result of the comparison, the designated recording speed falls within the calculated range, the controller 80 can determine the recording speed from the lowest limit value of the calculated recording speed range to the designated recording speed as a new range of a recording speed and determine one or more speeds within the new range as a recording speed at which the OPC operation will be performed.

Figure 3:
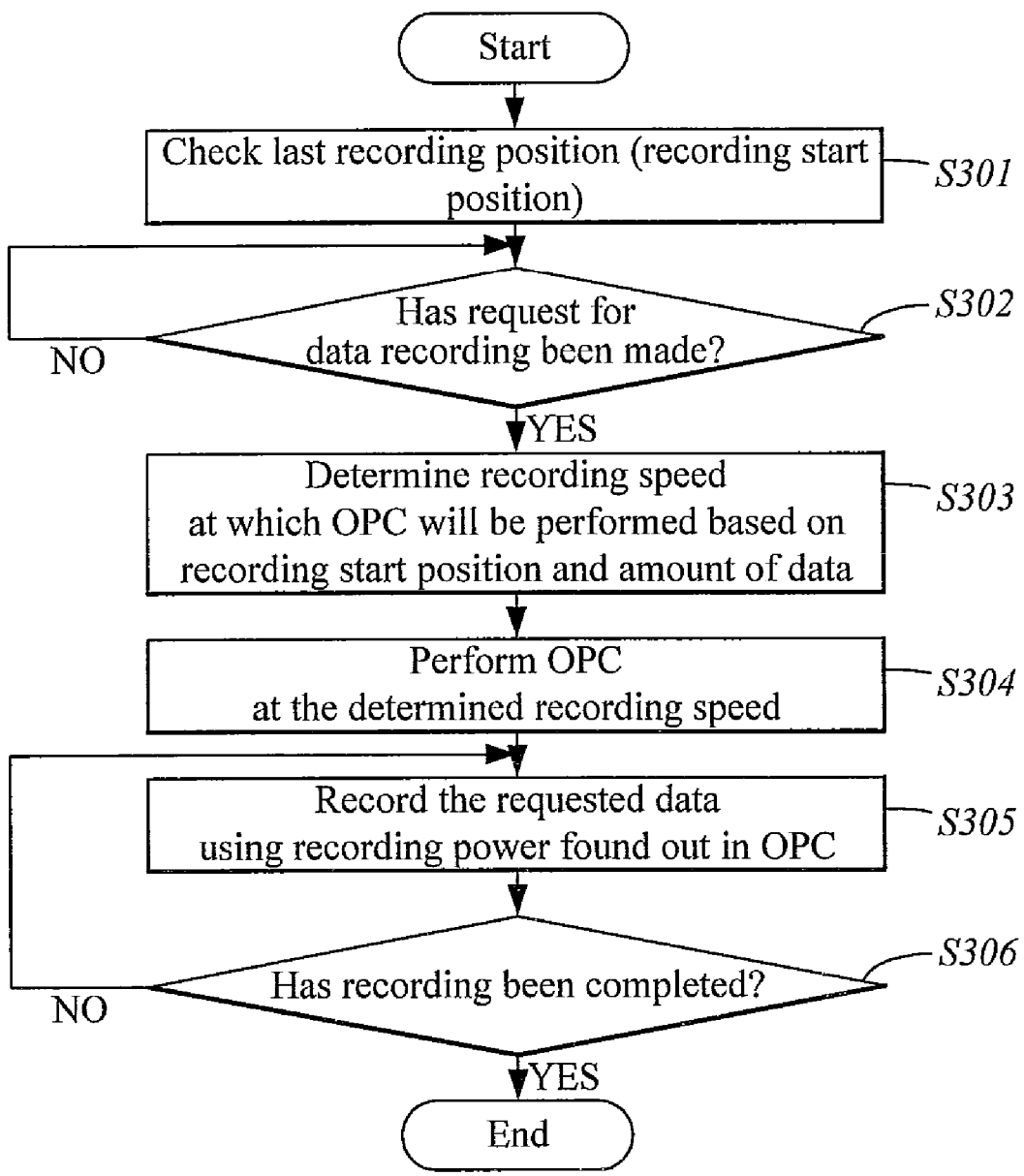
FIG. 3 is an operation flowchart illustrating a method of recording data on an optical disc according to an embodiment of this document.

FIG. 3 is an operation flowchart illustrating a method of recording data on an optical disc according to an embodiment of this document.

When the optical disc apparatus is powered on or the optical disc 10 is inserted into the optical disc apparatus, the controller 80 checks a last recording position at which data have been finally recorded in the data area of the optical disc 10 from a lead-in area, a navigation area, or a recording management area which is placed in an inner peripheral side to the data area of the optical disc 10 (S301). When writing new data, the last recording position corresponds to a recording start position.

It is then determined whether a request to record data has been received from a user (S302). If, as a result of the determination, the request is determined to have been received from the user, the controller 80 determines a recording speed at which an OPC operation will be performed based on the amount of data for which recording has been requested and the recording start position checked at step S301 (S303).

The controller 80 can calculate a recording end position at which data for which recording has been requested will be all recorded based on the amount of the data and the recording start position and also calculate a maximum recording speed available at each position. Here, the controller 80 can check a radius (or address) of the recording start position and a radius (or address) of the recording end position and can find out recording speeds available at the recording start position and the recording end position with reference to information of recording speeds which are available in the innermost periphery (an innermost periphery-side radius of the data area) and the outermost periphery (an outermost periphery-side radius of the data area). The recording speeds available at the innermost periphery and the outermost periphery are determined as a common recording speed in the optical disc apparatus and the optical disc. For example, when a maximum speed available to the optical disc apparatus in the outermost periphery is a 24-times speed and a maximum speed available to the optical disc in the outermost periphery is a 22-times speed, a recording speed available in the outermost periphery is determined as the 22-times speed.

After calculating the range of a recording speed that will apply to recording of the requested data as described above, the controller 80 can select one or more speeds corresponding to the calculated range and determine the selected one or more speeds as OPC recording speeds at which OPC operations will be performed. As described above, the one or more speeds within the calculated range may be selected as the OPC recording speeds, or at least one of recording speeds outside of the calculated range may be selected as the OPC recording speed.

Here, the controller 80 may differently control the number of recording speeds at which an OPC operation will be performed according to the range of the calculated recording speed. Further, the controller 80 may determine a position at which an OPC operation will be performed, an inner-peripheral PCA, an outer-peripheral PCA, or both the inner-peripheral PCA and the outer-peripheral PCA according to the value of a recording speed at which the OPC operation will be performed.

Further, in the case where a user designates a recording speed when requesting data recording, the controller 80, as described above, may compare the designated recording speed and the range of the calculated recording speed and determine a recording speed at which an OPC operation will be performed based on a result of the comparison.

The controller 80 obtains an optimal recording power that will apply to the requested data recording by performing an OPC operation at the OPC recording speed determined as described above (S304). The controller 80 can calculate an optimal recording power for different recording speeds that will apply to the data recording based on the speed at which the OPC operation has been performed.

Next, the controller 80 records the requested data on the optical disc while performing the requested data recording in the outer circumference direction from the recording start position to the recording end position of the data area based on the recording power obtained at step S304 (S305) and continues to perform the data recording operation until the requested data recording is completed (S306).

Accordingly, the time that it takes to perform data recording from a request for recording to the end of recording can be reduced, and an OPC operation can be stabilized. Furthermore, an optimal recording power can be obtained, and the recording quality can be improved.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

What is claimed is:

1. A method of recording data on an optical disc, comprising:
    calculating a recording end position based on a recording start position and an amount of data for which recording has been requested;
    calculating a range of a recording speed available from the recording start position to the recording end position;
    selecting one or more recording speeds at which the recording power control operation will be performed based on the calculated range;
    performing the recording power control operation at the selected recording speed; and
    recording the data for which recording has been requested on the optical disc based on a result of performing the recording power control operation.

2. The method of claim 1, further comprising, before the request for recording is made, checking the recording start position.

3. The method of claim 1, wherein selecting the one or more recording speeds comprises determining a number of recording speeds at which the recording power control operation will be performed based on the calculated range.

4. The method of claim 1, wherein the one or more recording speeds are selected within the calculated range.

5. The method of claim 1, wherein the one or more recording speeds are selected outside of the calculated range.

6. The method of claim 1, further comprising selecting an area in which the recording power control operation will be performed at the selected recording speeds.

7. The method of claim 1, wherein performing the recording power control operation comprises calculating a recording power for each of the recording speeds within the calculated range using results of performing the recording power control operation at the selected recording speeds.

8. The method of claim 1, further comprising, if a recording speed is designated, comparing the calculated range and the designated recording speed and selecting the one or more recording speeds at which the recording power control operation will be performed based on a result of the comparison.

9. The method of claim 8, wherein if, as a result of the comparison, the designated recording speed is lower than a lowest limit value of the calculated range, the designated recording speed is selected as a recording speed at which the recording power control operation will be performed.

10. The method of claim 8, wherein if, as a result of the comparison, the designated recording speed is included within the calculated range, a lowest limit value of the calculated range to the designated recording speed is determined as a new range of a recording speed, and a recording speed at which the recording power control operation will be performed is selected based on the new range.

11. An optical disc apparatus, comprising:
an optical pickup configured to record data on an optical disc or read data from the optical disc using a laser beam;
a recording/playback system configured to drive a spindle motor, a sled motor, and an optical pickup and process servo signals and recording/playback data; and
a controller configured to control the recording/playback system,
wherein the controller is configured to calculate a recording end position based on a recording start position and an amount of data for which recording has been requested, calculate a range of a recording speed available from the recording start position to the recording end position, select one or more recording speeds at which the recording power control operation will be performed based on the calculated range, and control the recording/playback system so that the recording/playback system performs the recording power control operation at the selected recording speed and records the data for which recording has been requested on the optical disc based on a result of performing the recording power control operation.

12. The optical disc apparatus of claim 11, wherein the controller is configured to check the recording start position by searching for the optical disc before the request for recording is made.

13. The optical disc apparatus of claim 11, wherein the controller is configured to determine a number of recording speeds at which the recording power control operation will be performed based on the calculated range.

14. The optical disc apparatus of claim 11, wherein the controller is configured to select the one or more recording speeds within the calculated range and/or outside of the calculated range or both.

15. The optical disc apparatus of claim 11, wherein the controller is configured to select an area in which the recording power control operation will be performed at the selected recording speeds.

16. The optical disc apparatus of claim 11, wherein the controller is configured to calculate a recording power for each of the recording speeds within the calculated range using results of the recording power control operation at the selected recording speeds.

17. The optical disc apparatus of claim 11, wherein, if a recording speed is designated, the controller is configured to compare the calculated range and the designated recording speed and select the one or more recording speeds at which the recording power control operation will be performed based on a result of the comparison.

18. The optical disc apparatus of claim 17, wherein if, as a result of the comparison, the designated recording speed is lower than a lowest limit value of the calculated range, the controller is configured to select the designated recording speed as a recording speed at which the recording power control operation will be performed.

19. The optical disc apparatus of claim 17, wherein if, as a result of the comparison, the designated recording speed is included within the calculated range, the controllers is configured to determine a lowest limit value of the calculated range to the designated recording speed as a new range of a recording speed and select a recording speed at which the recording power control operation will be performed based on the new range.

* * * * *